No. 784,058. PATENTED MAR. 7, 1905.
M. MANSON & H. DE H. CONNICK.
GLOBE.
APPLICATION FILED MAR. 15, 1904.

2 SHEETS—SHEET 1.

Witnesses:

Inventors:
Marsden Manson
Harris DeHaven Connick
By Miller, Starr & Cruse
Their Attys.

No. 784,058. PATENTED MAR. 7, 1905.
M. MANSON & H. DE H. CONNICK.
GLOBE.
APPLICATION FILED MAR. 15, 1904.

2 SHEETS—SHEET 2.

Witnesses: Inventors:

No. 784,058. Patented March 7, 1905.

UNITED STATES PATENT OFFICE.

MARSDEN MANSON AND HARRIS DE HAVEN CONNICK, OF SAN FRANCISCO, CALIFORNIA.

GLOBE.

SPECIFICATION forming part of Letters Patent No. 784,058, dated March 7, 1905.

Application filed March 15, 1904. Serial No. 198,293.

*To all whom it may concern:*

Be it known that we, MARSDEN MANSON and HARRIS DE HAVEN CONNICK, citizens of the United States, residing in the city and county of San Francisco and State of California, have invented new and useful Improvements in Globes, of which the following is a specification.

Our invention relates to globes or other round bodies; and it particularly relates to globes which are used for educational purposes, the educational matter being represented or impressed on the globe in any desired manner.

Our invention also has reference to a support for a globe.

We will describe a globe embodying our invention and a support therefor also embodying our invention and then point out their novel features in claims.

Figure 1:
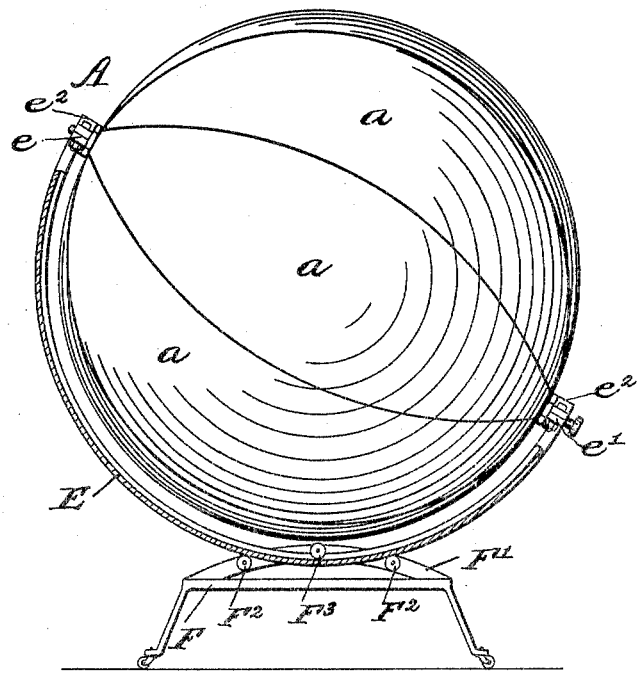
Figure 2:
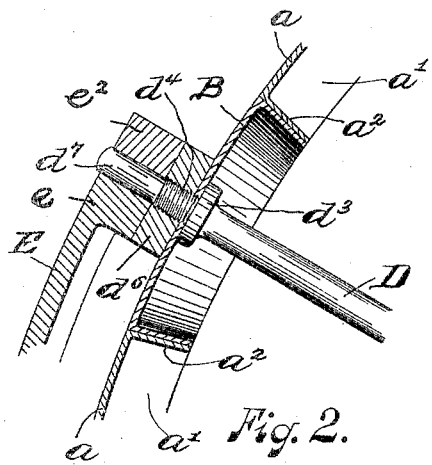
Figure 3:
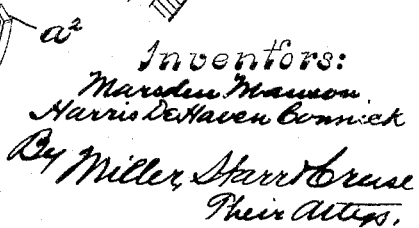
Figure 7:
Figure 4:
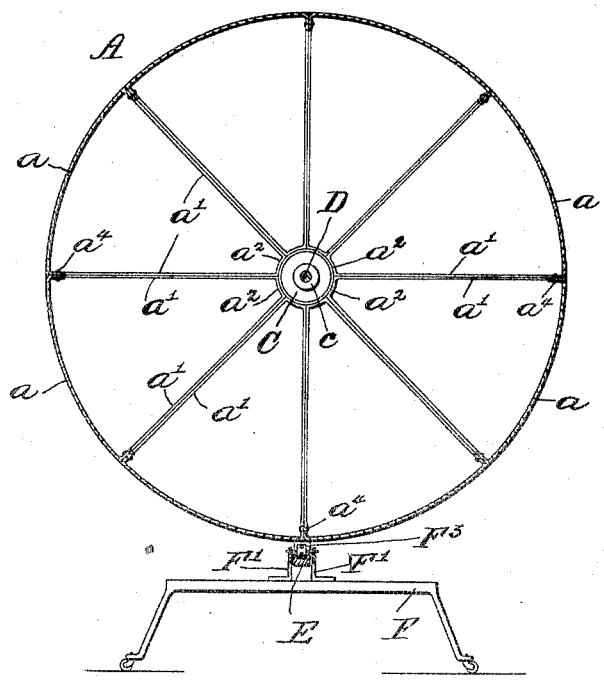
Figure 5:
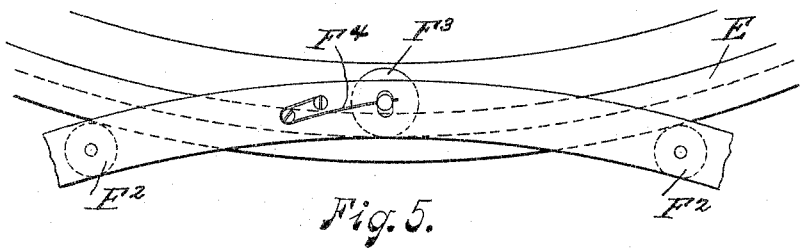
Figure 6:
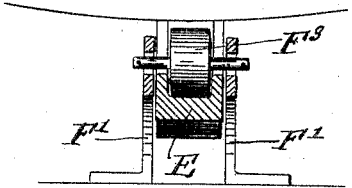

In the accompanying drawings, Figure 1 is a perspective view of a globe and a support therefor, each embodying our invention. Figs. 2 and 3 are detail views showing a method of attachment of an axis at the respective pole-sections of the globe. Fig. 4 is a vertical section of a globe with the axis horizontal. Fig. 5 is an enlarged view showing a method of mounting the globe. Fig. 6 is an enlarged detail vertical sectional view. Fig. 7 is a detail view of one of the sections of the globe.

Similar letters of reference designate corresponding parts in all of the figures.

Referring now to the drawings, A designates a globe which is constructed of a number of independent sections. In the drawings the globe is shown as comprising eight sections, each of which is substantially elliptical or lune-shaped as to contour. Each section (see Fig. 7) comprises a curved surface $a$, side flanges $a'$, and end flanges $a^2$. In forming the globe the sections are united with each other in any desired way—for example, by rivets $a^4$, passing through the side flanges. (See Fig. 4.) The end flanges of the sections when assembled form opposite openings, which receive what we term "polar" sections B and C. These polar sections may be detachable from the elliptical sections or they may be fastened thereto. Each section is preferably of metal and may be formed into the proper shape by any desired means or manner—as, for example, by a two-part die. The polar sections may be similarly formed or by any other desired means.

In the event of the globe being made for educational purposes, and especially for the study of geography, the educational matter may be placed on the globe in any desired manner. Preferably for the study of physical geography each section may have impressed upon it at the time of its formation by the die a portion of the earth or heavens or heavens and earth, one part of the die being especially prepared for this purpose. Each eighth section of the globe will therefore be forty-five degrees of the circumference of the earth, or three "hour-meridians." The polar sections may be treated in the same manner to illustrate the polar features of the earth. Instead of having a single die for both forming and impressing each section separate dies may be used for impressing the sections or they may be decorated in any desired manner.

D designates an axis which may be of any construction and material, preferably metal. At one end it is provided with two screw-threads $d$ $d'$, here shown as being of different diameters and with a detachable handpiece $d^2$, and at its other end with a shoulder $d^3$ and a screw-threaded portion $d^4$. In mounting the globe on its axis one of the pole-pieces—for example, the pole-piece C—is placed in position on the screw-thread $d$, a screw-threaded boss $c$ being provided on the pole-piece to permit of this. A nut $d^5$ is then placed on the screw-threaded portion $d'$ and against the polar section C. The other end of the axis is then passed through an opening in the polar section B and a nut $d^6$ placed on the screw-threaded portion $d^4$ and turned thereon to draw the two polar sections B and C into their respective openings. The flange or shoulder $d^3$ serves to prevent any distortion of the polar section B by the nut $d^6$. The flanges $a^2$ of the sections constituting the walls of the openings for the polar sections B and C, are preferably inclined, as are the walls of the polar sections, in order that a tight joint may be made and also to prevent the polar sections being forced into the globe. Any other means for accomplishing this may be employed. By this construction the axis acts as a tie-brace to the circular chords produced by the flanges of the sections, thereby adding stiffness to the structure. It will be understood, of course, that the several screw-threads are cut in directions which will prevent one nut or thread becoming loosened while a nut is being screwed onto another thread. The cylindrical portions $d^7$ beyond the pole-pieces are used as journals, as will be hereinafter described.

E designates a semicircular frame-piece, channel, or beam of any desired construction. It is provided with bearings $e\ e'$ at its ends, which receive the cylindrical portions $d^7$ of the axis D. The bearings $e\ e'$ are provided with removable caps $e^2$. The function of this semicircular frame or beam is to permit of the axis being placed at various angles with the horizontal or parallel with that of the earth. To enable this to be done, the frame is mounted on roller-bearings.

F designates a suitable stand or support, and F' a pair of brackets secured at its ends to the support F. $F^2$ designates a pair of rollers removably journaled in the brackets F' in about the same horizontal plane, and $F^3$ a roller removably journaled in elongated openings in the brackets F' in a plane outside of the horizontal plane of the rollers $F^2$. Springs $F^4$, secured at one of their ends to the brackets F', have their free ends extending through openings in the shaft of the roller $F^3$ or they may bear upon the shaft.

In mounting the frame E on the stand the roller $F^3$ is first removed to allow the frame E to rest on the rollers $F^2$, after which the roller $F^3$ is replaced in the brackets and in the channel of the frame or beam. This arrangement admits of the frame E being securely and easily moved on the stand.

Having thus described our invention, what we claim as new is—

1. A globe comprising a number of independent sections secured together and pole-sections.

2. A globe comprising a number of independent sections secured together, pole-sections and means for securing the pole-sections in place.

3. A globe comprising a number of independent sections secured together, pole-pieces, and an axis extending through the pole-pieces, and means for securing the pole-pieces and axis together.

4. The combination with a globe comprising a number of independent sections secured together, pole-pieces, and an axis, of a frame in which said axis is journaled and a stand on which said frame is movable.

5. A globe made of flanged lune-shaped sections fastened together through the flanges.

6. A globe made of lune-shaped sections fastened together, and inserted polar sections.

7. A globe made of flanged lune-shaped sections fastened together through the flanges and inserted polar sections.

8. A globe having separable inserted polar sections.

9. In combination with a globe, an axis on which it is mounted extending through the poles, each end of said axis having an extension beyond the surface of the globe, part of which is screw-threaded to receive a nut, and the remainder smooth to act as a trunnion for rotating the globe.

10. In combination with a globe, an axis extending from pole to pole and secured in a suitable manner to the globe at its poles, extensions for said axis, and means in which said extensions are journaled.

11. In combination with a globe, an axis for said pole having screw-threaded portions and nuts fitting on said screw-threaded portions.

12. In combination with a globe, polar sections for said globe, an axis extending through said polar sections provided with a screw-threaded portion and a flange at one end, a nut for clamping the polar section at that end against the flange, and provided with two screw-threaded portions at its other end, one of which receives a boss carried by the other polar section another of which receives a nut.

In testimony whereof we have hereunto signed our names in the presence of two subscribing witnesses.

MARSDEN MANSON.
HARRIS DE HAVEN CONNICK.

Witnesses:
JNO. H. MILLER,
WM. K. WHITE.